June 18, 1968  W. STELZER  3,388,950

BRAKE PRESSURE PROPORTIONING AND METERING VALVE

Filed Feb. 4, 1965

INVENTOR.
William Stelzer
BY
Torness, Dickey & Pierce.
ATTORNEYS.

United States Patent Office 3,388,950
Patented June 18, 1968

3,388,950
BRAKE PRESSURE PROPORTIONING
AND METERING VALVE
William Stelzer, Bloomfield Hills, Mich., assignor to
Kelsey-Hayes Company, Romulus, Mich., a corporation of Delaware
Filed Feb. 4, 1965, Ser. No. 430,433
17 Claims. (Cl. 303—6)

This invention relates generally to vehicular hydraulic brake systems, and particularly to a pressure control device adapted to proportion and meter the hydraulic pressure delivered to two sets of brake cylinders from a variable pressure producing source. The invention also relates to a novel valve element or seal usable in a metering and proportioning device.

It has been proposed that vehicular brake systems include control valving for delivering a hydraulic pressure to the front wheel brake cylinders which increases at a greater rate than the pressure delivered to the rear wheel brake cylinders at high rates of vehicle deceleration. This is desirable since the vehicle weight distribution shifts during vehicle deceleration with a progressively greater weight being borne by the front wheels and a progressively lesser weight being borne by the rear wheels as the rate of deceleration increases. A proper modulation of the ratio of the braking pressures delivered to the front and rear wheel brake cylinders can prevent premature loss of coefficient of friction between the rear wheels and the pavement and consequent rear wheel skidding in which the rear wheels attempt to overrun the front wheels and the vehicle skids sideways or "fishtails." Such modulation can also prevent excessive wear of the front wheel brakes as a result of their over-pressurization at low rates of deceleration.

In a brake system using disc brakes on the front wheels and drum brakes on the rear wheels, the pressure requirements of the two sets of brakes are very different. Drum brakes require an initial hydraulic pressure to overcome the force of their heavy return springs before any braking effect is realized while a substantially immediate braking effect is realized with disc brakes as hydraulic pressure develops in the system. Thus, in a system using both drum and disc brakes, the control valving should, ideally, delay delivery of pressure to the disc brakes until the drum brake return spring force is overcome so that a braking effect at both sets of wheels is realized simultaneously. Additionally, this valving desirably should possess design simplicity and be easily adapted for use in conventional hydraulic systems of this type.

It has been discovered that an effective modulation of the ratio of the braking pressures delivered to the front and rear wheel brake cylinders to satisfy the above conditions is obtainable through valving made responsive to master cylinder pressure. Thus, using increasing master cylinder pressure which is a sufficiently accurate indication of the vehicle deceleration rate, the device of the present invention correctly controls the proportionate ratio of braking pressures delivered to the brake cylinders.

Accordingly, the main objects of the present invention are to provide a proportioning and metering valve adapted to deliver unequal pressures to two sets of brakes which vary according to a predetermined relationship and maintain a close and accurate control over this relationship through a range of pressures, one which minimizes the number of dynamic seals exposed to atmospheric pressure and one which is relatively simple and inexpensive to manufacture, versatile in design and rugged and reliable in construction. Another object is to provide an improved alternately opening and closing hydraulic valve adapted for close pressure control. Other objects include the provision of a valve of the above type which is particularly adapted for use in a vehicle brake system having front wheel disc and rear wheel drum brakes wherein front wheel brake actuation is delayed until a selected master cylinder hydraulic pressure is reached and wherein the ratio of the pressures delivered to the front and rear wheel brake cylinders during vehicle deceleration is varied substantially in accordance with the rate of vehicle deceleration.

Other objects and advantages of the present invention will become more apparent from a consideration of the following detailed description taken in conjunction with the drawings in which.

Figure 1:
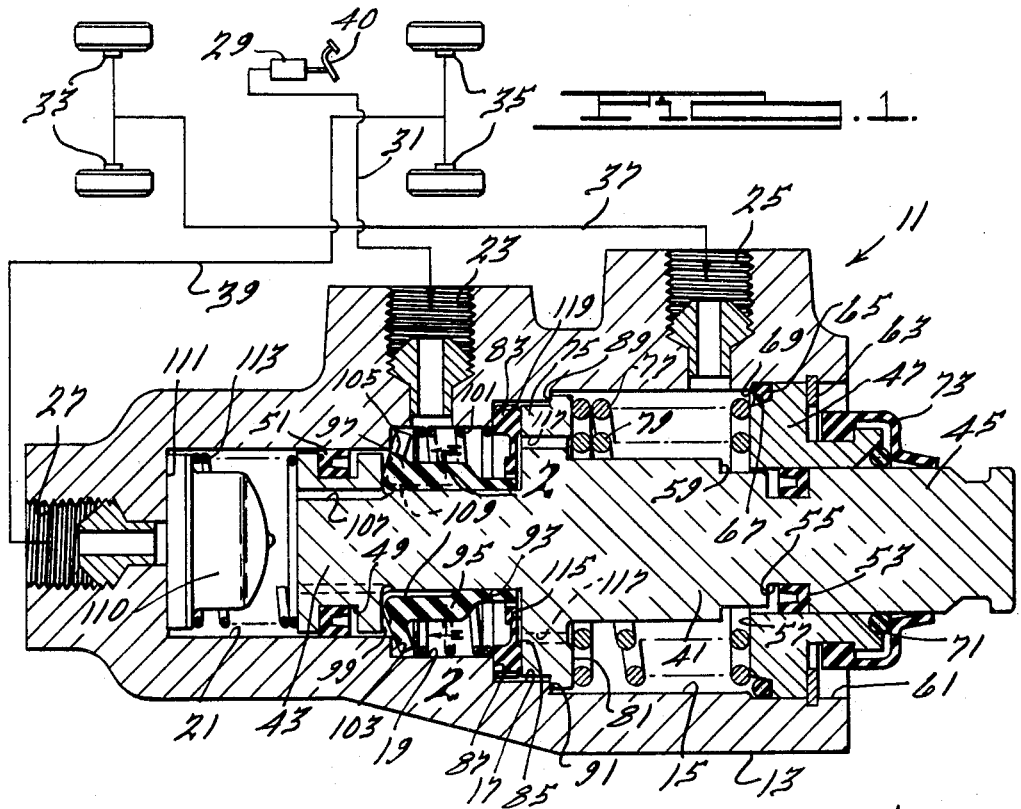
FIGURE 1 is a sectional view of a valve constructed according to the principles of the present invention and illustrated as incorporated within a vehicle hydraulic brake system.
Figure 2:
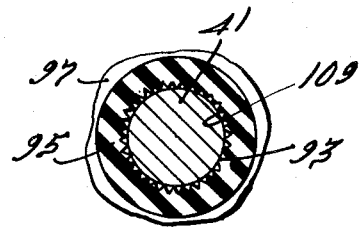
FIG. 2 is a sectional view of the structure of FIG. 1 taken along the line 2—2 thereof.

Referring now more specifically to the drawings, a proportioning and metering valve, shown generally at 11, is seen to include a housing 13 having communicating stepped bores 15, 17, 19 and 21 which communicate an inlet opening 23 and a pair of outlet openings 25 and 17. As shown, the valve inlet 23 is adapted to be connected to a vehicular brake master cylinder 29 at the outlet thereof by a conduit 31 while the valve outlets 25 and 27 are connected to front and rear wheel brake cylinders 33 and 35 by conduits 37 and 39, respectively. As described above, one vehicle braking system for which the valve of the present invention is adapted includes one having disc brakes at the front wheels and drum brakes at the rear wheels. The master cylinder 29 is actuated to deliver fluid pressure to the valve inlet 23 by actuation of a conventional foot pedal 40 connected either directly to the master cylinder 29 or through a booster motor (not shown).

A piston 41 is disposed within the stepped bore of the valve 11 for movement longitudinally thereof. As seen in FIG. 1, the piston 41 has an inner end 43 slidably disposed within the bore 21 and a generally cylindrical outer end 45 slidably disposed within an annular sleeve 47 mounted within the bore 15. The piston end 43 has an annular groove 49 which receives an annular lip seal 51 positioned to sealingly engage the wall of the bore 21 and prevent the flow of fluid therepast. Similarly, an annular lip seal 53 is positioned in an annular groove 55 in the other end 45 of the piston 41 to sealingly engage the wall of the sleeve 47. It is noted that the lip seal 53 is the only dynamic seal exposed to both atmospheric pressure and pressure within the system which differ considerably, the other piston dynamic seal 51 being exposed only to hydraulic pressures within the system.

The piston 41 is prevented from pulling out of the valve housing 13 by a radial shoulder 59 positioned to engage a radial face 57 on the sleeve 47. The sleeve 47, in turn, is retained within an enlarged bore 61 of the valve housing 13 by a snap ring 63. An O-ring seal 65 is positioned between a tapered inner end 67 of the sleeve 47 and a tapered shoulder 69 between the enlarged bore 61 and the bore 15 to prevent the flow of fluid therepast. A dust seal including an O-ring 71 and a flexible sleeve 73 engage the sleeve 47 and the piston end 45 outside the valve housing 13 to prevent dust, grease or other foreign matter from contaminating the sliding joint between the sleeve 47 and piston end 45.

The piston 41 has a radially outwardly extending flange 75 intermediate the ends 43 and 45. A pair of relatively strong compression springs 77 and 79 are disposed within the bore 15 and each has one end engaging the inner face 57 of the sleeve 47 and the other end engaging a radial surface 81 on the piston flange 75. The force of these springs 77 and 79 normally biases the piston 41 to the left, as viewed in FIG. 1 and causes the flange 75 to compress an enlarged annular bead 83 of a check valve seal 85 into sealing engagement with a shoulder or valve seat 87 which separates the bores 17 and 19 thereby normally preventing the flow of fluid around the flange 75. An annular shoulder 89 on the flange 75 engages an annular shoulder 91 separating the bores 15 and 17 to limit movement of the piston 41 to the left and prevent excessive compression and wear of the seal bead 83.

According to the principles of the present invention, a highly sensitive valve including an elastomeric valve sleeve 95 is snugly disposed on a generally cylindrical surface 93 between the piston end 43 and the flange 75 and has a generally radially extending flange 97 positioned to engage a radial face 99 of the piston end 43. The sleeve 95 is preferably constructed from a relatively stiff elastomeric material having a durometer value of about 60 to 70. A relatively light compression spring 101 has one end engaging the sealing bead 83 to maintain it in engagement with the piston flange 75 while the other end of the spring 101 engages and biases the radial flange 97 toward the face 99 and a radial shoulder 103 separating the bores 19 and 21.

The outer end of the radial flange 97 is formed with one or more notches 105 so that with the piston 41 in the position shown in FIG. 1 or even displaced slightly to the right from this position, hydraulic fluid delivered from the master cylinder 29 to the valve inlet 23 and the bore 19 passes through the notches 105 and through a plurality of axial passages 107 in the piston end 43 and into the bore 21. The valve sleeve 95 is formed with a plurality of grooves 109 which extend outwardly along a portion of the radial flange 97 to permit the flow of fluid between the flange 97 and the surface 99. However, when the piston 41 is displaced far enough to the right, the radial flange 97 seats against the face 99 and prevents the flow of fluid from the bore 19 to the bore 21 through the openings 107. The fluid displaced past the valve 95 when the flange 97 is unseated from the surface 99 then flows freely past a residual valve 110 conveniently positioned in the valve housing 13 and held against an end wall 111 of the bore portion 21 by a relatively high light compression spring 113 and is delivered to the rear wheel cylinders 35 by way of the outlet opening 27 and the conduit 39. The residual valve 109 serves to maintain a residual amount of fluid pressure in the conduit 39 and rear wheel cylinders 35 at all times, while permitting fluid to flow from the valve 11 to the rear wheel cylinders 35 during brake pedal application and to flow from the rear wheel cylinders to the valve upon release of the brake pedal. One such residual valve is illustrated and described in detail in the copending application Ser. No. 231,746, filed Oct. 19, 1962, and owned by the assignee of the present application. Thus, when the master cylinder 29 is actuated, the fluid trapped in the conduit 39 and rear wheel cylinders 35 is pressurized.

With the piston 41 positioned as shown in FIG. 1, the seal 83 sealingly engages the flange 75 and the shoulder 87 and prevents the flow of fluid therepast as described above, and immediately upon actuation of the master cylinder 29, fluid pressure within the bore 19 biases the check valve 85 into engagement with a radial face 115 of the flange 75 to prevent the flow of fluid through a plurality of passages 117 communicating the bores 15 and 19. Thus, in this position of the piston 41, fluid is prevented from flowing to the bore 15 and therefore to the front wheel cylinders 33.

According to the principles of the present invention, the springs 77 and 79 are selected to maintain the piston 41 in the position illustrated in FIG. 1 with the seal bead 83 engaging the shoulder 87 until a predetermined master cylinder pressure is reached. The pressure at which the springs 77 and 79 yield and permit fluid to flow to the front wheel cylinders is selected to correspond to the pressure required to compress the relatively heavy return springs (not shown) of the rear wheel drum brakes. Thus, when these springs yield, the piston flange 75 and seal bead 83 move away from the shoulder 87 and fluid flows therebetween and along a serrated outer surface 119 of the seal bead. This fluid then passes into the bore 15 and is delivered to the front wheel cylinders 33 by way of the outlet 25 and conduit 37. Also, this initial movement of the piston 41 to the right is not sufficient to permit the valve flange 97 to seat against the piston face 99 so that fluid continues to be delivered to the rear wheel cylinders 35. Since the front wheel brakes are disc brakes, a braking effect is realized thereat immediately upon the seal bead 83 moving away from the shoulder 87 which is simultaneous with application of the rear wheel drum brakes since the force of their return springs is overcome at this same pressure.

At the instant the force of the springs 77 and 79 is overcome, the forces on the piston 41 tending to move it, are equal. Assuming that $P_m$ equals master cylinder pressure, $A_{19}$ equals the cross-sectional area of the bore 19, $A_{43}$ equals the cross-sectional area of the piston end 43, $A_{99}$ equals the cross-sectional area of the inner annular face 99 of the piston end and $F_s$ equals the force of the springs 77 and 79, the following relationship expresses the forces on the piston 41 at the instant the force of the springs 77 and 79 is overcome:

$$P_m A_{19} - (A_{43} - A_{99}) + P_m A_{43} = P_m A_{99} + F_s$$

$$P_m A_{19} - P_m A_{43} + P_m A_{43} + P_m A_{99} - P_m A_{99} = F_s$$

$$P_m A_{19} = F_s$$

Thus, an increase in the master cylinder pressure ($P_m$) results in a force unbalance causing the piston 41 to move to the right as seen in the figure.

As described above, springs 77 and 79 are selected to be overcome by the force of the master cylinder pressure acting on the piston 41 when this master cylinder pressure is sufficient to overcome the force of the rear wheel brake return springs. Beginning with this master cylinder pressure, both the rear wheel brakes and the front wheel brakes are applied since fluid within the bore 19 passes around the piston flange 75 into the bore 15 and to the front wheel cylinders 33 by way of the conduit 37. However, as fluid at master cylinder pressure enters the bore 15, it acts upon the face 81 of the flange 75 and along with the force of the springs 75 and 77 is sufficient to move the piston 41 back to the left causing the bead 83 to reengage and seal at the shoulder 87 before the valve flange 97 seats against the surface 99. A further increase in master cylinder pressure thereafter is reflected by pressure increases in the bores 19 and 21 accordingly while the fluid pressure in the bore 15 remains constant. This again results in a force unbalance on the piston 41 whereupon it again moves to the right and additional fluid flows to the bore 15 and to the front wheel cylinders 33 and the piston 41 again moves to the left to seat the bead 83 against the shoulder 87.

This alternate opening and closing action of the bead 83 and shoulder 87 with the valve flange 97 remaining spaced from the surface 99 continues as the master cylinder pressure increases until the master cylinder pressure, and, therefore, the pressure in the valve 11, reaches a level where the forces acting on all sides of the piston 41 remain unbalanced tending to move the piston 41 to the right and the bead 83 remains spaced from the shoulder 87. Under these conditions, master cylinder pressure is acting on all sides of the piston except the end portion 45, resulting in a hydraulic force unbalance on the piston 41 to the right equal to the master cylinder pressure multiplied by the cross-sectional area of the piston end portion 45. Thus, when this force unbalance exceeds the force of the springs 77 and 79, the piston 41 moves to the right and keeps the bead 83 spaced from the shoulder 87.

When the master cylinder pressure reaches the point where it maintains the bead 83 spaced from the shoulder 87, the piston 41 will have moved to the right an extent sufficient to permit the flange 97 of the valve 95 to seat against the radial surface 99 of the piston end 43 under the force of the spring 101 to prevent additional fluid from passing from the bore 19 through the passages 107 to the rear wheel cylinders 35. However, a small amount of fluid remains in the grooves 109 formed in the valve 95 after the flange 97 seats against the radial surface 99. Thus, with a further increase in master cylinder pressure, the valve sleeve 95 is squeezed against the piston surface 93 collapsing the grooves 109 and forcing the fluid from the grooves 109 through the passages 107 and to the rear wheel cylinders. Thus, during this phase of braking, the pressure to the rear wheel cylinders increases at a rate somewhat less than the rate of increase in master cylinder pressure. The pressure to the front wheel cylinders 33, on the other hand, increases equally with master cylinder pressure since the seal 83 remains open.

After the grooves 109 in the valve 95 have completely collapsed, a further increase in master cylinder pressure jointly increases the pressure in the bores 15 and 19 and, therefore, the forces on the faces of the piston 41 exposed thereto. This includes all portions of the piston 41 except for the piston end 45, which is exposed to atmospheric pressure, and the piston end 43, which is sealed against master cylinder pressure by the valve flange 97 seated against the surface 99. As seen in FIG. 1, the cross-sectional area of the piston end 43 is greater than the cross-sectional area of the piston end 45; therefore, as long as the valve flange 97 seats against the surface 99, an increase in master cylinder pressure tends to move the piston 41 to the left. Specifically, assuming that $P_m$ equals master cylinder pressure, $P_r$ equals rear wheel cylinder pressure, $F_s$ equals the force of the springs 77 and 79, $A_{43}$ equals the cross-sectional area of the piston end 43 and $A_{45}$ equals the cross-sectional area of the piston end 45, the forces on the piston 41 after the flange 97 of the valve 95 is seated against the radial surface 99 are expressed as follows:

$$P_r A_{43} = P_m(A_{43} - A_{45}) + F_s$$

The force of the springs ($F_s$) may also be represented by $P_m' A_{45}$, where $P_m'$ equals the master cylinder pressure at which the springs 77 and 79 yield and the seal 83 remains spaced from the seat 87. Substituting, $$P_r A_{43} = P_m(A_{43} - A_{45}) + P_m' A_{45}$$

$$P_r = P_m \frac{(A_{43} - A_{45})}{A_{43}} + P_m' \frac{A_{45}}{A_{43}}$$

Thus, a further increase in master cylinder pressure, after grooves 109 have collapsed, is able to produce an increase in rear wheel cylinder pressure by movement of the piston 41 to the left and consequent cracking or peeling of the valve flange 97. The flange 97 of the valve 95 engages the shoulder 103 upon movement of the piston 41 to the left, causing the flange 97 to move away from the radial surface 99 thereby permitting additional fluid to be delivered to the rear wheel cylinders. Rear wheel pressure will only be increased enough to satisfy the above equation, after which the piston 41 will move to the right and the valve flange 97 will again seat against the radial surface 99. This alternate opening and closing, cracking or peeling action of the flange 97 against the surface 99 occurs with the seal 83 spaced from the shoulder 87 since the piston 41 does not move far enough to the left during this sequence and it continues with further increase of master cylinder pressure and serves to maintain a very close control over the pressure delivered to the rear wheel cylinders 35. Specifically, the rear wheel cylinder pressure increases with increasing master cylinder pressure in a ratio determined by the quantity $$\frac{(A_{43} - A_{45})}{A_{43}}$$

which is hereinafter referred to as the hydraulic ratio.

Figure 3:
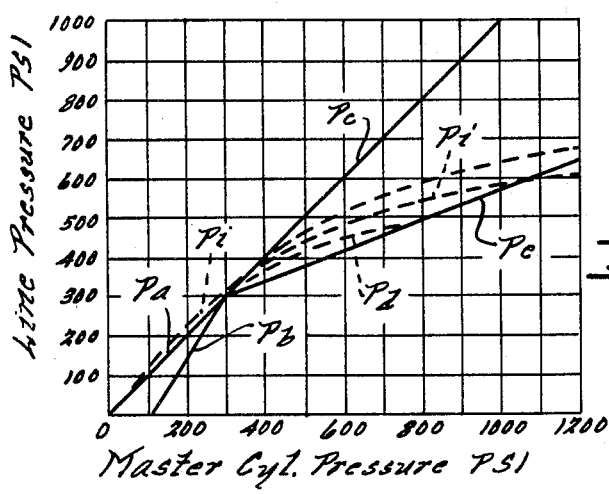
FIG. 3 is a graph illustrating the braking pressures attained by the use of the present device.

It is to be understood that the relative areas $A_{43}$ and $A_{45}$ of the piston 41 are selected to provide a hydraulic ratio best suited to the particular vehicle with which the valve is to be used and the general weight distribution thereof. However, in a typical example, a hydraulic ratio of about 2.6:1 is satisfactory. Additionally, in this typical example, a pressure of about 110 p.s.i. is needed to overcome the force of the rear drum brake return springs and a master cylinder pressure of about 300 p.s.i. is needed to overcome the force of the springs 77 and 79. Thus, as illustrated by line $P_a$ in FIG. 3, the pressure to the rear wheel cylinders 35 increases with master cylinder pressure to about 300 p.s.i. The front wheel cylinders are not actuated until master cylinder pressure reaches about 110 p.s.i. and the front and rear wheel cylinder pressures controllably increase with increasing master cylinder pressure to a pressure of about 300 p.s.i. as shown by line $P_b$. For master cylinder pressures in excess of 300 p.s.i., the valve flange 97 is seated against the radial surface 99 and master cylinder pressure and front wheel cylinder pressure increase jointly as shown by line $P_c$; however, rear wheel cylinder pressure increases at a considerably lesser rate as the grooves 109 collapse, as shown by line $P_d$, and thereafter increases in proportion to master cylinder pressure according to the hydraulic ratio, as shown by line $P_e$. Ideal rear wheel cylinder pressure is illustrated by curve $P_i$ in FIG. 3. It is to be noted that the ideal pressure becomes a range of pressures above 300 p.s.i., and depends upon variable weight distribution of the vehicle, such as, for example, passenger distribution and trunk load, both of which change the position of the vehicle center of gravity.

The actual rear wheel cylinder pressure achieved in the instant case falls very close to the ideal range as a result of the controlled pressure $P_d$ delivered by the valve 95 as it is compressed to collapse the grooves 109. The curve $P_d$ can be made to follow the ideal range $P_i$ even more closely by making the grooves 109 larger, if desired.

When the master cylinder pressure is released by releasing the pedal 40, the front and rear wheel cylinder pressures follow the same curves as they did during master cylinder pressure increase except that below about 300 p.s.i., the check valve 85 opens permitting fluid to flow from the bore 15 through the passages 117. Thus, both front and rear wheel cylinder pressures follow the curve $P_a$.

While a preferred embodiment has been illustrated and described in detail above, various additions, substitutions, modifications and omissions may be made thereto without departing from the spirit of the invention as encompassed by the appended claims.

What is claimed is:

1. A proportioning and metering device for a vehicular hydraulic brake system comprising
    a body having a bore therein and an inlet opening and first and second outlet openings,
    first and second shoulders in said bore,
    piston means slidably disposed in said bore and having a first passage means therethrough communicating said inlet and first outlet opening and forming with said bore a second passage means communicating said inlet and second outlet opening,
    first valve means carried by said piston adapted to overlay said first passage means for preventing the flow of fluid to said first outlet and having a portion positioned to engage the first shoulder,
    second valve means carried by said piston adapted to engage said second shoulder for preventing the flow of fluid to said second outlet, resilient means associated with said piston normally holding said first valve means in engagement with said first shoulder to open said first passage means and said second valve means in engagement with said second shoulder, said piston being responsive to a first inlet pressure to open said second valve means, and to a range of inlet pressures greater than said first inlet pressure for opening and closing said first valve means to deliver fluid to said first outlet at a predetermined pressure relationship to the fluid delivered to said second outlet.

2. A proportioning and metering device for a vehicular hydraulic brake system comprising a body having a bore and an inlet opening and first and second outlet openings, first and second shoulders in said bore, a piston slidable in said bore and having a first passage communicating said inlet and said first outlet, and forming with said bore a second passage communicating said inlet and said second outlet, an elastomeric sleeve carried by said piston adapted to overlay said first passage and having a radial flange positioned to engage said first shoulder and hold said sleeve spaced from said first passage, an elastomeric seal on said piston engageable with said second shoulder to close said second passage, resilient means normally biasing said piston in a direction causing said sleeve flange and said elastomeric seal to engage said first and second shoulders, respectively, the effective area of said piston exposed to inlet pressure when said second passage is open being sufficient to overcome said resilient means and move said piston to open said second passage when inlet pressure reaches a predetermined level, the effective area of said piston exposed to inlet pressure when said second passage is open being such as to move said piston to alternately open and close said first passage over a range of inlet pressures greater than said predetermined pressure to deliver fluid pressure to said first outlet in a selected relationship to the fluid pressure delivered to said second outlet.

3. A proportioning and metering device for a vehicular hydraulic brake system comprising a body having a bore and an inlet opening and first and second outlet openings, first and second shoulders in said bore, a piston slidable in said bore and having a first passage communicating said inlet and said first outlet, and forming with said bore a second passage communicating said inlet and said second outlet, an elastomeric sleeve carried by said piston adapted to overlay said first passage and having a radial flange positioned to engage said first shoulder and hold said sleeve spaced from said first passage, an elastomeric seal on said piston engageable with said second shoulder to close said second passage, resilient means normally biasing said piston in a direction causing said sleeve flange and said elastomeric seal to engage said first and second shoulders, respectively, the effective area of said piston exposed to inlet pressure when said second passage is open being sufficient to overcome said resilient means and move said piston to open said second passage when inlet pressure reaches a predetermined level, the effective area of said piston exposed to inlet pressure when said second passage is open being such as to move said piston to alternately open and close said first passage over a range of inlet pressures greater than said predetermined pressure to deliver fluid pressure to said first outlet in a selected relationship to the fluid pressure delivered to said second outlet, a third passage in said piston communicating said inlet and said second outlet, said elastomeric seal being normally spaced from said third passage but adapted to overlay and seal said third passage in response to fluid pressure at said inlet.

4. A proportioning and metering device for a vehicular hydraulic brake system comprising a body having a bore and an inlet opening and first and second outlet openings, first and second shoulders in said bore, a piston slidable in said bore and having a first passage communicating said inlet and said first outlet, and forming with said bore a second passage communicating said inlet and said second outlet, an elastomeric sleeve carried by said piston adapted to overlay said first passage and having a radial flange positioned to engage said first shoulder and hold said sleeve spaced from said first passage, an elastomeric seal on said piston engageable with said second shoulder to close said second passage, resilient means normally biasing said piston in a direction causing said sleeve flange and said elastomeric seal to engage said first and second shoulders, respectively, the effective area of said piston exposed to inlet pressure when said second passage is open being sufficient to overcome said resilient means and move said piston to alternately open and close said second passage in response to a first range of inlet pressures, the effective area of said piston exposed to inlet pressure when said second passage is open being such as to move said piston to hold said second passage open and close said first passage over a second range of inlet pressures greater than said first range of predetermined pressures to deliver fluid pressure to said first outlet in a selected relationship to the fluid pressure delivered to said second outlet.

5. A proportioning and metering device for a vehicular hydraulic brake system comprising a body having a bore and an inlet opening and first and second outlet openings, first and second shoulders in said bore, a piston slidable in said bore and having a first passage communicating said inlet and said first outlet, and forming with said bore a second passage communicating said inlet and said second outlet, an elastomeric sleeve carried by said piston adapted to overlay said first passage and having a radial flange positioned to engage said first shoulder and hold said sleeve spaced from said first passage, said sleeve having a plurality of angularly spaced inwardly facing grooves, an elastomeric seal on said piston engageable with said second shoulder to close said second passage, resilient means normally biasing said piston in a direction causing said sleeve flange and said elastomeric seal to engage said first and second shoulders, respectively, the effective area of said piston exposed to inlet pressure when said second passage is open being sufficient to overcome said resilient means and move said piston to open said second passage when inlet pressure reaches a first predetermined level, the effective area of said piston exposed to inlet pressure when said second passage is open being such as to move said piston to close said first passage when said inlet pressure reaches a second predetermined level greater than said first predetermined pressure, said elastomeric sleeve being responsive to a first range of inlet pressures greater than said second predetermined pressure to collapse said grooves thereby increasing the fluid pressure delivered to said first outlet, the effective area of said piston exposed to inlet pressure after said grooves have collapsed being such as to alternately open and close said first passage over a second range of pressures greater than said first range to deliver fluid pressure to said first outlet in a selected relationship to the fluid pressure delivered to said second outlet.

6. A proportioning and metering device for a vehicular hydraulic brake system comprising a body having a bore extending inwardly from one end thereof, said body having an inlet opening connected to a fluid pressure source, a first outlet opening at the other end, and a second outlet opening, a piston slidable in said bore and having a first passage formed at its inner end communicating said inlet and said first outlet opening, said piston having its outer end exposed to atmospheric pressure and of a smaller cross-sectional area than said inner end, a second passage formed between said bore and said piston at an intermediate portion thereof communicating said inlet and said second outlet opening, first and second valve means carried by said piston for preventing the flow of fluid to said first and second outlets, respectively, resilient means associated with said piston normally holding said first valve means open and said second valve means closed, whereby said piston is responsive to a first predetermined inlet pressure to overcome said resilient means and open said second valve means, and to a range of inlet pressures greater than said first inlet pressure to alternately open and close said first valve means while holding said second valve means open to deliver fluid to said first outlet at a predetermined relationship to the fluid delivered to said second outlet.

7. A proportioning and metering device for a vehicular hydraulic brake system comprising a body having a bore extending inwardly from one end thereof, said body having an inlet opening connected to a fluid pressure source, a first outlet opening at the other end, and a second outlet opening, a piston slidable in said bore and having a first passage formed at its inner end communicating said inlet and said first outlet opening, said piston having its outer end exposed to atmospheric pressure and of a smaller cross-sectional area than said inner end, a second passage formed between said bore and said piston at an intermediate portion thereof communicating said inlet and said second outlet opening, an elastomeric sleeve disposed on said piston at a reduced diameter portion adjacent the inner end thereof and adapted to overlay and close said first passage, said sleeve having a radial portion positioned to engage first shoulder in said bore to hold said first passage open, a seal on said piston engageable with a second shoulder in said bore to close said second passage, resilient means normally biasing said piston in a direction holding said first passage open and said second passage closed, whereby said piston is responsive to a first predetermined inlet pressure to overcome said resilient means and open said second passage, and to a range of inlet pressures greater than said first inlet pressure to alternately open and close said first passage while holding said second passage open to deliver fluid to said first outlet at a predetermined relationship to the fluid delivered to said second outlet.

8. A proportioning and metering device for a vehicular hydraulic brake system comprising a body having a bore extending inwardly from one end thereof, said body having an inlet opening connected to a fluid pressure source, a first outlet opening at the other end, and a second outlet opening, a piston slidable in said bore and having a first passage formed at its inner end communicating said inlet and said first outlet opening, said piston having its outer end exposed to atmospheric pressure and of a smaller cross-sectional area than said inner end, a second passage formed between said bore and said piston at an intermediate portion thereof communicating said inlet and said second outlet opening, an elastomeric sleeve disposed on said piston at a reduced diameter portion adjacent the inner end thereof and adapted to overlay and close said first passage, first resilient means normally biasing said sleeve toward a position closing said first passage, said sleeve having a radial portion positioned to engage a first shoulder in said bore to hold said first passage open against said first resilient means, a seal held on said piston by said first resilient means engageable with a second shoulder in said bore to close said second passage, second resilient means normally biasing said piston in a direction holding said first passage open and said second passage closed, whereby said piston is responsive to a first predetermined inlet pressure to overcome said resilient means and open said second passage and to a range of inlet pressures greater than said first inlet pressure to alternately open and close said first passage while holding said second passage open to deliver fluid to said first outlet at a predetermined relationship to the fluid delivered to said second outlet.

9. A proportioning and metering device for a vehicular hydraulic brake system comprising a body having a bore extending inwardly from one end thereof, said body having an inlet opening connected to a fluid pressure source, a first outlet opening at the other end, and a second outlet opening, a piston slidable in said bore and having a first passage formed at its inner end communicating said inlet and said first outlet opening, said piston having its outer end exposed to atmospheric pressure and of a smaller cross-sectional area than said inner end, a second passage formed between said bore and said piston at an intermediate portion thereof communicating said inlet and said second outlet opening, an elastomeric sleeve disposed on said piston at a reduced diameter portion adjacent the inner end thereof and adapted to overlay and close said first passage, said sleeve having a plurality of inwardly facing grooves communicating with said first passage and a radial portion positioned to engage a first shoulder in said bore to hold said first passage open, a seal on said piston engageable with a second shoulder in said bore to close said second passage, resilient means normally biasing said piston in a direction holding said first passage open and said second passage closed, whereby said piston is responsive to a first predetermined inlet pressure to overcome said resilient means and open said second passage, and to a second predetermined inlet pressure greater than said first predetermined pressure to close said first passage, said elastomeric sleeve being responsive to a first range of inlet pressures greater than said second predetermined pressure to collapse said grooves thereby increasing the fluid pressure delivered to said first outlet, said piston being further responsive to a second range of inlet pressures greater than said first range of inlet pressures to alternately open and close said first passage while holding said second passage open whereby to deliver fluid to said first outlet at a predetermined relationship to the fluid delivered to said second outlet.

10. A proportioning and metering device for a vehicular hydraulic brake system comprising
- a body having a bore extending inwardly from one end thereof,
- said body having an inlet opening connected to a fluid pressure source, a first outlet opening at the other end, and a second outlet opening,
- a piston slidable in said bore and having a first passage formed at its inner end communicating said inlet and said first outlet opening,
- said piston having its outer end exposed to atmospheric pressure and of a smaller cross-sectional area than said inner end,
- a second passage formed between said bore and said piston at an intermediate portion thereof communicating said inlet and said second outlet opening,
- an elastomeric sleeve disposed on said piston at a reduced diameter portion adjacent the inner end thereof and adapted to overlay and close said first passage,
- said sleeve having a radial portion positioned to engage a first shoulder in said bore to hold said first passage open,
- a seal on said piston engageable with a second shoulder in said bore to closed said second passage,
- a third passage in said piston communicating said inlet and said second outlet opening and adapted to be closed by said seal in response to inlet pressure,
- said seal being normally spaced from said third passage,
- resilient means normally biasing said piston in a direction holding said first passage open and said second passage closed,
- whereby said piston is responsive to a first predetermined inlet pressure to overcome said resilient means and open said second passage and to a range of inlet pressures greater than said first inlet pressure to alternately open and close said first passage while holding said second passage open to deliver fluid to said first outlet at a predetermined relationship to the fluid delivered to said second outlet.

11. A proportioning and metering device for a vehicular hydraulic brake system comprising
- a body having a bore extending inwardly from one end thereof,
- said body having an inlet opening connected to a fluid pressure source, a first outlet opening at the other end, and a second outlet opening,
- a piston slidable in said bore and having a first passage formed at its inner end communicating said inlet and said first outlet opening,
- said piston having its outer end exposed to atmospheric pressure and of a smaller cross-sectional area than said inner end,
- a second passage formed between said bore and said piston at an intermediate portion thereof communicating said inlet and said second outlet opening.
- an elastomeric sleeve disposed on said piston at a reduced diameter portion adjacent the inner end thereof and adapted to overlay and close said first passage,
- said sleeve having a plurality of angularly spaced grooves communicating with said first passage and a radial portion positioned to engage a first shoulder in said bore to hold said first passage open,
- said grooves extending continuously along its inner surface and radially outwardly along its radial portion,
- a seal on said piston engageable with a second shoulder in said bore to closed said second passage,
- resilient means normally biasing said piston in a direction holding said first passage open and said second passage closed,
- whereby said piston is responsive to a first predetermined inlet pressure to overcome said resilient means and open said second passage,
- and to a second predetermined inlet pressure greater than said first predetermined pressure to close said first passage,
- said elastomeric sleeve being responsive to a first range of inlet pressures greater than said second predetermined pressure to collapse said grooves thereby increasing the fluid pressure delivered to said first outlet,
- said piston being further responsive to a second range of inlet pressures greater than said first range of inlet pressures greater than said first range of inlet pressures to alternately open and close said first passage while holding said second passage open whereby to deliver fluid to said first outlet at a predetermined relationship to the fluid delivered to said second outlet.

12. A proportioning and metering device for a vehicular hydraulic brake system comprising
- a body having a bore extending inwardly from one end thereof,
- said body having an inlet opening connected to a fluid pressure source, a first outlet opening at the other end, and a second outlet opening,
- a residual valve in said body adjacent said first outlet opening,
- a piston slidable in said bore and having a first passage formed at its inner end communicating said inlet and said first outlet opening,
- said piston having its outer end exposed to atmospheric pressure and of a smaller cross-sectional area than said inner end,
- a second passage formed between said bore and said piston at an intermediate portion thereof communicating said inlet and said second outlet opening,
- first and second valve means carried by said piston for preventing the flow of fluid to said first and second outlets, respectively,
- resilient means associated with said piston normally holding said first valve means open and said second valve means closed,
- whereby said piston is responsive to a first predetermined inlet pressure to overcome said resilient means and open said second valve means, and to a range of inlet pressures greater than said first inlet pressure to alternately open and close said first valve means while holding said second valve means open to deliver fluid to said first outlet at a predetermined relationship to the fluid delivered to said second outlet.

13. A valve comprising
- a body having an inlet and an outlet opening,
- a piston slidable in a bore formed in said body,
- passage means in said piston communicating said inlet and outlet openings,
- an elastomeric sleeve carried by said piston and adapted to overlay and close said passage means,
- said sleeve having a radial portion at one end positioned to engage a shoulder in said bore to hold said sleeve spaced from said passage means,
- said piston being movable in response to a first predetermined inlet pressure to permit said sleeve to close said passage means and in response to a range of inlet pressures greater than said first predetermined pressure to alternately open and close said passage means.

14. A valve comprising
- a body having an inlet and an outlet opening,
- a piston slidable in a bore formed in said body,
- resilient means normally biasing said piston in one direction,
- passage means in said piston communicating said inlet and outlet openings,
- an elastomeric sleeve carried by said piston at a reduced diameter portion thereof and adapted to overlay and close said passage means, said sleeve having a discontinuous radial portion at one end positioned to engage a shoulder in said bore to hold said sleeve spaced from said passage means, said piston being movable against said resilient means in response to a first predetermined inlet pressure to permit said sleeve to close said passage means and in response to a range of inlet pressures greater than said first predetermined pressure to alternately open and close said passage means.

15. A valve comprising a body having an inlet and an outlet opening, a piston slidable in a bore formed in said body, passage means in said piston communicating said inlet and outlet openings, an elastomeric sleeve carried by said piston and adapted to overlay and close said passage means, said sleeve having a radial portion at one end positioned to engage a shoulder in said bore to hold said sleeve spaced from said passage means, a plurality of angularly spaced grooves formed in said sleeve extending axially along its inner surface and communicating with said passage means, said piston being movable in response to a first predetermined inlet pressure to permit said sleeve to close said passage means, said sleeve being compressible in response to a first range of inlet pressures greater than said first predetermined pressure to collapse said grooves and increase the pressure delivered to said outlet, said piston being further responsive to a second range of inlet pressures greater than said first range to alternately open and close said passage means.

16. A valve comprising a body having an inlet and an outlet opening, a piston slidable in a bore formed in said body, passage means in said piston communicating said inlet and outlet openings, an elastomeric sleeve carried by said piston and adapted to overlay and close said passage means, said sleeve having a radial portion at one end positioned to engage a shoulder in said bore to hold said sleeve spaced from said passage means, a plurality of angularly spaced grooves formed in said sleeve extending continuously along its inner surface and radially outwardly along its radial portion and communicating with said passage means, said piston being movable in response to a first predetermined inlet pressure to permit said sleeve to close said passage means, said sleeve being compressible in response to a first range of inlet pressures greater than said first predetermined pressure to collapse said grooves and increase the pressure delivered to said outlet, said piston being further responsive to a second range of inlet pressures greater than said first range to alternately open and close said passage means.

17. In a hydraulic valve having an inlet adapted to be connected to a source of fluid pressure, an outlet to be adapted to be connected to a brake cylinder, and an opening communicating said inlet and outlet, that improvement which comprises a valve element having a radially extending sealing surface operable to close said opening and an elastomeric annular wall provided with inner and outer peripheral surfaces, one of said peripheral surfaces having a pluarlity of angularly spaced axially extending grooves communicating with said outlet, said one peripheral surface being engageable with an adjacent rigid wall of the valve, and the other said peripheral surfaces being exposed to inlet fluid pressure whereby said annular wall will compress against said nonelastic wall and collapse said grooves in response to increasing inlet pressure after closure of said opening to pressurize fluid at said inlet.

References Cited
UNITED STATES PATENTS

| | | | |
|---|---|---|---|
| 3,304,130 | 2/1967 | Doerfler | 303—6 |
| 3,315,469 | 4/1967 | Stelzer | 303—6 |

EUGENE G. BOTZ, *Primary Examiner.*